Dec. 9, 1958  J. G. MOORHEAD  2,863,330
ROTATIONAL SETTING MECHANISM
Filed April 5, 1957  2 Sheets-Sheet 1

FIG. I

JOHN G. MOORHEAD
INVENTOR

BY W. E. Thibodeau, A. W. Dew
& J. P. Edgerton

Dec. 9, 1958   J. G. MOORHEAD   2,863,330
ROTATIONAL SETTING MECHANISM
Filed April 5, 1957                           2 Sheets-Sheet 2

JOHN G. MOORHEAD
INVENTOR

BY W. E. Thibodeau, A. W. Dew
& J. D. Edgerton

United States Patent Office 2,863,330
Patented Dec. 9, 1958

2,863,330

ROTATIONAL SETTING MECHANISM

John G. Moorhead, Silver Spring, Md., assignor to the United States of America as represented by the Secretary of the Army Application April 5, 1957, Serial No. 651,119

4 Claims. (Cl. 74—526)

(Granted under Title 35, U. S. Code (1952), sec. 266)

The invention described herein may be manufactured and used by or for the Government for governmental purposes without the payment to me of any royalty thereon.

This invention relates to an instantaneous setting mechanism and more particularly to a device capable of effecting any desired rotational displacement in unit steps.

A principal object of this invention is to transmit a desired rotational displacement from a displacement source.

Another object is to transmit any desired rotational displacement, in unit steps, from a plurality of displacement sources.

A further object is to transmit any desired rotational displacement, in unit steps, from a plurality of variable displacement sources, proportional to the actuation of one, all, or any combination of the sources.

In general, this invention comprises a series of displacement-effecting members in the form of stacked plates having variable rotational displacements, and a system of displacement-transmitting members coupling the plates. The arrangement of the plates relative to each other is such that unit rotational displacement output is possible by actuation of any of the series of rotational displacement-effecting members.

The specific nature of the invention as well as other objects, uses and advantages thereof will clearly appear from the following description and from the following accompanying drawing, in which.

Figure 1:
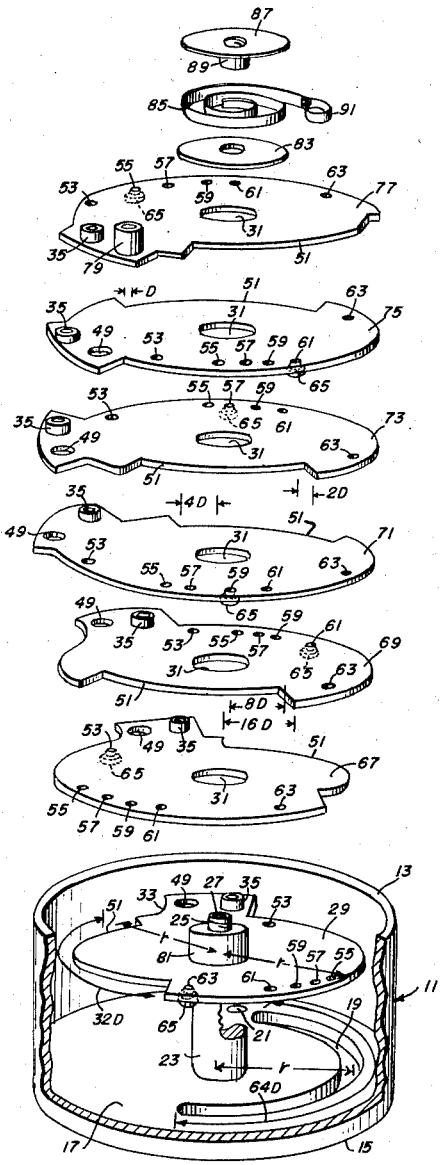
Figure 1 is an exploded perspective view of the invention with certain parts broken away.
Figure 2:
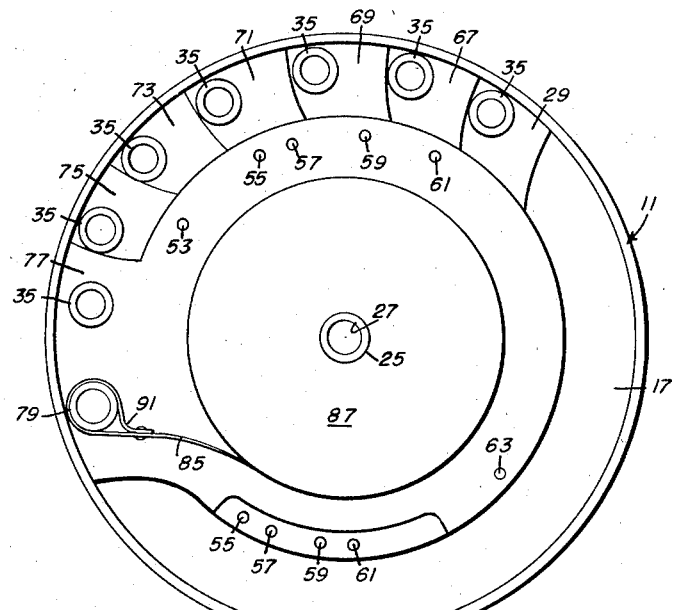
Figure 2 is a top view of the assembled device of Figure 1.
Figure 3:
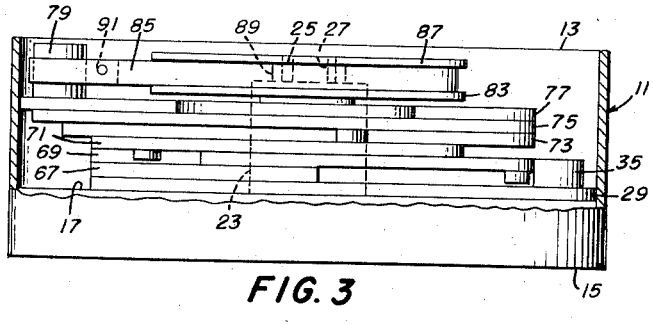
Figure 3 is a side elevation view of the assembled device of Figure 1 with certain parts broken away.

Referring to the drawing, where the mechanism of this invention is illustrated in its initial operating position, a hollow cylindrical cup or casing 11 may have an open end 13 and a closed end 15. Formed in the inside surface 17 of end 15 is a circular groove or recessed portion 19 of predetermined length. A disc portion 21, preferably flush with the interior surface 17, is provided to suitably present means on which a low-melting point solder may be applied. Extending from end 15 is an elongated shaft 23 which has a reduced diameter threaded nipple 25. A bore 27 is provided longitudinally through shaft 23 and further extending through end 15.

Rotatably mounted on shaft 23 by means of circular opening 31 and proximate to surface 17 is a generally circular shaped plate 29.

Figure 4:
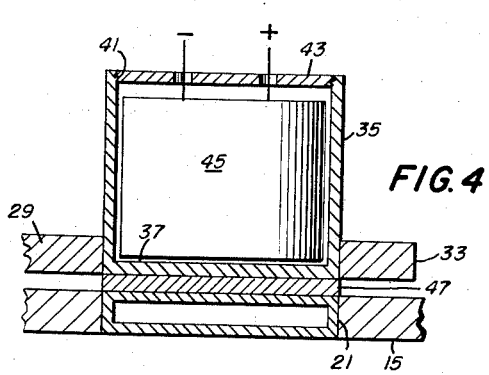
Figure 4 is an enlarged sectional view of an exemplary fusible rivet assembly.

Radially extending from an outer edge of plate 29 may be a mounting segment 33. Segment 33 may assume a relative size to conveniently support a fusible hollow rivet 35. Rivet 35 may be circular in cross-section and may have a closed end 37 flush with the bottom surface of plate 29 and an internally threaded open end 41. A threaded closure 43 may conveniently cooperate with open end 41 to maintain an electrically primed heat squib 45 in hollow rivet 35. Rivet 35 and disc portion 21 are preferably fused or locked together by a low melting point solder 47 as shown in Figure 4. Consequently plate 29 will be relatively rigidly secured or locked to end 15 by means of the low melting point solder 47. A disc portion 49 similar to disc portion 21 is further provided on segment 33 substantially as shown. Plate 29 is suitably recessed or grooved at 51. Considerations governing the selection of optimum length and width for groove 51 will become evident from the description that will follow. Openings 53, 55, 57, 59, 61, and 63 are further provided in plate 29 and are spaced from each other and from the outer edge of plate 29 at predetermined distances. As illustrated a stop pin 65 is inserted in opening 63 and is adapted to be movable in groove 19.

Plates 67, 69, 71, 73, 75, and 77, all substantially identical to plate 29, are mounted on shaft 23, but are preferably mounted in a manner such that alternate plates are in a relative turned over relationship. Thus plate 29 is in what may be termed an upright position, whereas plate 67 is turned over.

The respective stop pins 65 for the plates are inserted in selected openings for convenient predetermined positioning in the groove of the next plate below. On the top plate 77 may be an output rod 79 suitably secured adjacent the fusible rivet for that plate. The fusible rivet for each plate is suitably fused to the disc portion of the plate below by a low melting point solder. The fusible rivet assemblies employed to lock the plate in operative position may take the form as illustrated in Figure 4.

Thus, in the preferred form of the invention as illustrated, seven substantially identical plates are rotatably positioned on shaft 23. The top plate 77 should be substantially flush with shoulder 81 on shaft 23. An annular disc 83 may be threaded on nipple 25 to aid in maintaining the plates on the shaft 23 and to act as a retaining means for coiled spring 85. The inner end of spring 85 may be suitably secured to an internally threaded spring cover 87 by suitable rivet means 89. Cover 87 is threaded on nipple 25 to insure proper functioning of spring 85. The free end of spring 85 is provided with a loop 91 that conveniently fits circumferentially about output rod 79.

The center lines of the groove 19 of end 15 and of the groove of the respective plates are preferably at the same radius $r$ from the longitudinal axis of the mechanism. Openings 53, 55, 57, 59, 61 and 63 are similarly spaced at a distance $r$ from the longitudinal axis of the mechanism. Accordingly, the stop pins 65 for the respective plates will be at a distance $r$ from the longitudinal axis of the mechanism. The width of the grooves should be sufficient to allow movement of the stop pins therein. Any rotational movement that does take place in the assembled device will be in a counter-clockwise direction because of the construction and arrangement of the parts and the biased or loaded state of the coiled spring 85. The stop pin 65 of plate 29 is permitted a rotational displacement of 64D in the groove 19 of end 15, D being an arbitrary unit of displacement. The stop pin 65 of plate 67 is so positioned as to be displaceable a distance of 32D in the groove of plate 29. The stop pin 65 of plate 69 has a displacement of 16D in the groove of plate 67. Displacements of 8D, 4D, 2D, and D are afforded the respective stop pins 65 of plates 71, 73, 75 and 77. Thus the openings 53, 55, 57, 59, 61 and 63 can be spaced at predetermined intervals so that by proper selection of an opening for a stop pin in the respective plates, depending on the position of the plate, stop pin displacements to the order of $2^nD$, where $n$ is a whole number, can be effected. Seven plates have been selected in the illustrated embodiment to enable rotational displacement of the output rod 79 in integer steps from 1 to 127 by actuation of various combinations of the seven heat squibs. The heat squibs are preferably electrically connected in such manner that they may be selectively fired individually, together, or in any combination. The electrical leads for the squibs can be conveniently passed through bore 27 in shaft 23 and then connected to a suitable power source. Suitable bearing means may be provided between the plates and other movable parts to minimize friction. As illustrated, the radially extending segments 33 etc., are conveniently offset with respect to each other to insure free counter-clockwise rotation of each plate, proper soldering of rivet assemblies and relatively compact design.

In operation, the plates are stacked in the cup 11 substantially as shown. The coiled spring 85 applies a torque to the upper plate. When a squib is fired, sufficient heat will be generated to melt the low melting point solder. Accordingly, a fusible rivet will be released by the firing if its squib and the corresponding plate is permitted to turn until its stop pin is arrested by the end of groove in the next plate below. When a particular selection of the squibs are fired the solder in the corresponding rivets is melted and the corresponding plates will rotate until their stop pins are arrested in the grooves below. Since the total angle turned by the upper plate is the sum of the angles turned by whatever plates are allowed to turn, any angle desired can be obtained in integer steps from 1 to 127 where the unit step is the arbitrary chosen angle turned by the first plate.

Firing of all the squibs will result in an angular rotational output rod 79 displacement of 127D. Firing of the squib on plate 29 and the squib on plate 77 simultaneously will produce an output rod displacement of 65D. Mathematical structural analysis will reveal the particular squibs that should be fired to give the desired displacement.

The magnitude of the torque applied by coiled spring 85 and the relatively fast response of the solder in melting upon firing of the corresponding squib, provide an effective means for changing electrical energy into mechanical movements. The mechanism of this invention is adapted to be usable countless times by employing new squibs for those expended and resoldering the respective rivet assemblies.

By employing additional plates, having angles of rotation consistent with the series $2^nD$, the range of integer steps can be increased to 255, 511, etc. As will be apparent the location of the output rod 79 can be altered to meet varying needs without substantially affecting the performance of the device. Electromagnets, fluid pressure, or compressed air mechanisms can be substituted for the fusible rivet assemblies.

The mechanism and principles of this invention can be applied to computers and to the setting of various timing and other devices.

It will be apparent that the embodiments shown are only exemplary and that various modifications can be made in construction and arrangement within the scope of the invention as defined in the appended claims.

I claim:

1. Means for producing selectively any of a plurality of discrete rotational displacements, said means comprising: a shaft; a base immovably fastened to one end of said shaft; a plurality of plates rotatably mounted on said shaft; releasable locking means holding the bottommost of said plates to said base in such manner as to prevent rotation of said plate in relation to said base; a plurality of additional releasable locking means holding each subsequent plate to the plate below it in such manner as to prevent the rotation of each plate in relation to the plate below it; means for selectively releasing said locking means; stop means for limiting the travel of said bottommost plate upon the release of the locking means holding it to said base; a plurality of additional stop means for limiting the travel of each subsequent plate in relation to the plate below it upon the release of the associated locking means; and spring means for applying a torque to the uppermost of said plates, so that upon selective release of said locking means said uppermost plate is displaced rotationally through a predetermined angle in relation to said shaft and said base.

2. Means for producing selectively any of a plurality of discrete rotational displacements as in claim 1 wherein said locking means comprises a low melting point solder, and said means for selectively releasing said locking means comprises a heat squib proximate to said solder.

3. Means for producing selectively any of a plurality of discrete rotational displacements as in claim 1 wherein said discrete rotational displacements are in integer unit steps; and said stop means are so constructed and arranged that said travel of said plurality of plates are in the order of $2^nD$, $n$ being a whole number, D a unit of angular rotation.

4. Means for producing selectively any of a plurality of discrete rotational displacements as in claim 3 wherein each of said plurality of plates are substantially identical; alternate plates being in a turned over position; and said plates presenting openings at their respective peripheries for predetermined positioning of said stop means.

References Cited in the file of this patent
UNITED STATES PATENTS

| | | |
|---|---|---|
| 1,339,052 | Bauer | May 4, 1920 |
| 2,484,638 | May | Oct. 11, 1949 |
| 2,604,965 | Schweighofer et al. | July 29, 1952 |